(12) United States Patent
Bergman et al.

(10) Patent No.: US 9,459,086 B2
(45) Date of Patent: Oct. 4, 2016

(54) SHAPE SENSOR DEVICES, SHAPE ERROR DETECTION SYSTEMS, AND RELATED SHAPE SENSING METHODS

(71) Applicant: Machine Concepts, Inc., Minster, OH (US)

(72) Inventors: Guil Bergman, Ft. Recovery, OH (US); Anthony Enneking, Minster, OH (US)

(73) Assignee: Machine Concepts, Inc., Minster, OH (US)

( * ) Notice: Subject to any disclaimer, the term of this patent is extended or adjusted under 35 U.S.C. 154(b) by 306 days.

(21) Appl. No.: 14/182,105

(22) Filed: Feb. 17, 2014

(65) Prior Publication Data

US 2015/0233694 A1 Aug. 20, 2015

(51) Int. Cl.
  *G01B 5/207* (2006.01)
(52) U.S. Cl.
  CPC .................................... *G01B 5/207* (2013.01)
(58) Field of Classification Search
  CPC ........ B21B 38/02; G01B 7/28; G01B 7/287; G01B 5/207; G01B 5/285; G01B 7/293; G01B 7/34; G01B 7/345; G01B 3/22; G01B 3/28; G01B 5/04; G01B 5/046; G01B 5/20; G01B 5/28; G01B 21/20; G01B 21/30; G01B 38/04; G01B 38/10; G01B 38/00
  See application file for complete search history.

(56) References Cited

U.S. PATENT DOCUMENTS

| | | |
|---|---|---|
| 3,280,921 A | 10/1966 | Bickford |
| 3,301,031 A | 1/1967 | Bearer |
| 3,416,340 A | 12/1968 | Reesor |
| 3,496,744 A | 2/1970 | Mizuno et al. |
| 3,499,306 A | 3/1970 | Pearson |
| 3,581,536 A | 6/1971 | Terwilliger |
| 3,596,489 A | 8/1971 | Ball |
| 3,600,672 A * | 8/1971 | Kubo ...................... B21B 38/02 324/209 |
| 3,641,810 A | 2/1972 | Smirmaul |
| 3,756,050 A | 9/1973 | Kubo et al. |
| 3,788,534 A | 1/1974 | Shumaker |
| 3,850,024 A * | 11/1974 | Ando ...................... B21B 38/02 72/11.7 |
| 3,875,776 A | 4/1975 | Morooka |
| 3,902,345 A | 9/1975 | Shida |
| 3,998,316 A * | 12/1976 | Kamm .................... B23P 23/06 198/346.1 |
| 4,019,131 A * | 4/1977 | Yamada ................. B21B 38/02 318/653 |
| 4,031,741 A | 6/1977 | Schaming |
| 4,116,029 A | 9/1978 | Fabian et al. |
| 4,188,809 A | 2/1980 | Ishimoto et al. |
| 4,292,838 A | 10/1981 | Larsen |
| 4,380,921 A | 4/1983 | Matsui |
| 4,422,988 A | 12/1983 | Kornylak |
| 4,454,738 A | 6/1984 | Buta |

(Continued)

FOREIGN PATENT DOCUMENTS

| | | |
|---|---|---|
| JP | 52-43452 A | 4/1977 |
| JP | 10137831 A * | 5/1998 |

*Primary Examiner* — Daniel S Larkin
*Assistant Examiner* — Jamar Ray
(74) *Attorney, Agent, or Firm* — Standley Law Group LLP

(57) ABSTRACT

Devices, systems and methods for detecting the shape of a moving strip of material with high resolution along the edges thereof. Device and system embodiments may include a plurality of displacement-type shape sensor assemblies that may be collectively linearly displaced in a direction substantially transverse to the direction of a moving strip of material being examined, and also selectively activated or deactivated as necessary so as to provide edge-to-edge strip coverage to the extent possible.

20 Claims, 5 Drawing Sheets

(56) References Cited

U.S. PATENT DOCUMENTS

| | | | |
|---|---|---|---|
| 4,512,170 A | 4/1985 | Hsu | |
| 4,633,693 A | 1/1987 | Tahara et al. | |
| 4,635,458 A | 1/1987 | Bradlee | |
| 4,651,549 A | 3/1987 | Masui | |
| 4,674,310 A | 6/1987 | Ginzburg | |
| 4,680,978 A | 7/1987 | Ginzburg et al. | |
| 4,698,990 A | 10/1987 | Petri et al. | |
| 4,715,209 A | 12/1987 | Oshima | |
| 4,726,213 A | 2/1988 | Manchu | |
| 4,730,472 A | 3/1988 | Ellis | |
| 4,750,343 A * | 6/1988 | Richter | B21B 37/32 72/11.4 |
| 4,752,695 A * | 6/1988 | Pirlet | B21B 38/02 250/559.2 |
| 4,771,622 A | 9/1988 | Ginzburg | |
| 4,809,527 A | 3/1989 | Mitchell | |
| 4,881,392 A | 11/1989 | Thompson et al. | |
| 5,069,054 A | 12/1991 | Hladky et al. | |
| 5,329,798 A | 7/1994 | Takakura et al. | |
| 5,465,214 A * | 11/1995 | Jeuniaux | G01B 11/306 700/117 |
| 5,535,129 A | 7/1996 | Keijser | |
| 5,560,237 A | 10/1996 | Yasuda et al. | |
| 5,680,785 A | 10/1997 | Quehen et al. | |
| 5,901,591 A | 5/1999 | Kaplan | |
| 6,029,485 A | 2/2000 | Bohmer | |
| 6,216,517 B1 | 4/2001 | Hein | |
| 6,338,262 B1 | 1/2002 | Donini et al. | |
| 6,442,369 B1 | 8/2002 | Swartz et al. | |
| 6,658,947 B1 | 12/2003 | Sendzimir et al. | |
| 6,769,279 B1 | 8/2004 | Bergman et al. | |
| 6,857,301 B1 | 2/2005 | Bergman et al. | |
| 7,918,124 B2 | 4/2011 | Eiting et al. | |
| 2001/0007422 A1 * | 7/2001 | Noe | G01B 7/345 324/209 |
| 2004/0194520 A1 * | 10/2004 | Ide | B21B 38/02 72/9.1 |
| 2006/0123888 A1 | 6/2006 | Galburt et al. | |
| 2007/0193322 A1 * | 8/2007 | Beck | B21B 37/28 72/11.7 |

* cited by examiner

SHAPE SENSOR DEVICES, SHAPE ERROR DETECTION SYSTEMS, AND RELATED SHAPE SENSING METHODS

TECHNICAL FIELD

Devices and methods for detecting the shape of a moving strip of material with high resolution along the edges thereof.

BACKGROUND

Strip (which may also be referred to herein as "sheet") materials are used or produced in various industries. In at least certain of these industries, it is desired that a strip of material of interest have as flat a profile as possible. Unfortunately, it is also known that at least certain strip material manufacturing processes commonly impart one or more types of deformation to the strip materials produced thereby, which deformation tends to reduce the flatness of the strip materials. To that end, various devices, systems and techniques have been developed for both detecting and correcting the flatness of a moving strip of material.

While not limited thereto, a common use of such aforementioned flatness detecting and correcting devices, systems and techniques occurs in the production of strip metal products, wherein hot slabs or billets of steel and other metals are rolled into thin sheets. This hot-rolling process, as well as several devices, systems and techniques for detecting and/or correcting the flatness of sheet metal products produced thereby, is described in more detail in U.S. Pat. No. 6,587,301 (the '301 patent) to Bergman et al.

As described in the '301 patent, hot-rolling mills typically produce sheet metals by using a series of rolls to exert a pressing force on a hot slab or billet that is passed beneath the rolls. However, exertion of a uniform pressing (flattening) force across the width of the strip is difficult. Consequently, finished strip materials often possess undesirable shape defects, such as a wavy edge(s) or a center buckle. These shape defects are generally the result of a non-uniform lengthwise stretching of the strip across its width. This non-uniform stretching produces stresses within the strip that lead to shape defects such as those recited above.

As also described in the '301 patent, microprocessor-controlled multi-roll levelers capable of automatically correcting for such shape defects in metal strip materials now exist and are available from Machine Concepts, Inc. in Minster, Ohio. Shape defects in the strip materials may be detected and provided to these levelers by shape measurement devices. To this end, both an air-bearing shape meter and displacement-type shape sensor are described in the '301 patent for detecting shape defects in moving strips of metal and other materials. Basically, an air-bearing shape meter operates to detect shape defects by sensing changes in the contact forces imparted thereto by a passing strip of material. In contrast, a displacement-type shape sensor, which is of interest here, operates to detect shape defects by measuring an amount of linear displacement of a sensor(s) thereof afforded by a loose section of a strip of material passing overhead.

In addition to the air-bearing shape meter and displacement-type shape sensor described above, both of which make contact with the material being examined, a novel non-contact type shape sensor device has also been developed and is also available from Machine Concepts, Inc. Examples of this non-contact shape sensor are described in more detail in U.S. Pat. No. 7,918,124 (the '124 patent) to Eiting et al. Generally speaking, and without limiting the scope of the '124 patent, a non-contact shape sensor device of the '124 patent is a displacement-type shape sensor device employing a number of fluid-emitting sensor heads that allow a moving strip of material passing by the sensor heads to float on a cushion of fluid instead of directly contacting the sensor heads. Both a contacting and non-contact displacement-type shape sensor device may comprise a number of individual shape sensors arranged to traverse the width of a moving strip of material.

While both of the displacement-type shape sensors described respectively in the '301 patent and the '124 patent work quite well, it is nonetheless realized that there exist certain conditions wherein operation of a displacement-type shape sensor may be further optimized. Particularly, normal practice is to retract (deactivate) any sensors that are completely outside of the width of a strip of material being examined, as well as any sensors that will be only partially covered (to some predetermined extent) by the strip of material being examined. In other words, it is preferable that the edges of the strip be as close as possible to the outside edges of the outside-most active shape sensors.

In the case of a displacement-type shape sensor employing a series of roller bearings, such as is described in the '301 patent, deactivation of the sensor(s) ensures that neither the sensor or the edge of the strip of material will be damaged as the strip of material moves across the shape sensor device. In the case of a shape sensor employing a fluid-emitting sensor head, as described in the '124 patent, deactivation of the sensor(s) may be appropriate when the edges of the moving strip of material cover an insufficient number of the sensor head fluid-emitting nozzles to allow for proper operation of the sensor. Consequently, a controller in communication with such a shape sensor device is typically programmed to deactivate the outside-most sensors when the location of the edges of a given strip on the outside-most sensors (with respect to the width of that strip) is not sufficiently close to the outside edge of the roller or sensor head. The distance from the outside roller/sensor head edge that results in deactivation of the sensors may vary.

One problem associated with deactivating partially contacted/covered outside sensors as described above, is that the strip of material may then overhang by a significant amount the sensors that subsequently become the outside-most active sensors. Without a sensor under the edges of the overhanging section of the strip, there may be insufficient edge shape information to feed back to the control system of a leveler, other shape correction apparatus, etc. Consequently, defects located along the edge portions of the strip of material may not be adequately detected and said defects may not be acceptably corrected.

It can be understood from the foregoing comments that there is room for optimization of displacement-type shape sensor devices and their methods of use for detecting defects in the shape of a moving strip of material. Embodiments of devices, systems and methods of the invention are so optimized.

SUMMARY

Embodiments of the invention are directed to displacement-type shape sensor devices and methods of use thereof for detecting shape defects in a moving strip of material. Shape sensor device embodiments of the invention may be used in conjunction with, for example, a leveler or other shape correction apparatus that is adapted to remove shape defects from a moving strip of material.

One exemplary embodiment of a displacement-type shape sensor device includes a plurality of individual displacement sensors that may be aligned, and are arranged to traverse the width of a moving strip of material of interest. The individual displacement sensors of this exemplary sensor device are comprised of sensor heads in the form of free-spinning precision roller bearings that may be attached by a bracket to a linear guide. An actuator, such as a pneumatic cylinder, is provided to impart appropriate movement to each roller so as to gently force the rollers against the moving strip of material.

This embodiment of the displacement-type shape sensor device detects loose areas across the width of the strip of material as the strip passes by (e.g., over or under) the device and the rollers. Therefore, A change in the shape of the strip as it passes by the rollers results in a change in the vertical position of a roller(s) whose position on the shape sensor device corresponds to the location of the shape change.

Another exemplary embodiment of a displacement-type shape sensor device also includes a plurality of individual displacement sensors that may be aligned, and are arranged to traverse the width of a moving strip of material of interest. Unlike the aforementioned displacement-type shape sensor device, however, embodiments of this version of a displacement-type shape sensor device employ non-contact displacement sensors.

To provide the non-contact functionality, each non-contact shape sensor employs a fluid-emitting sensor head that allows a moving strip of material passing by the sensor head to float on a cushion of fluid (e.g., air). A plurality of nozzles may be distributed across a strip-facing side of the sensor head for this purpose and pressurized fluid may be emitted from the nozzles in a balanced manner. In a manner similar to that of the strip-contacting displacement-type shape sensor device, the non-contact shape sensor device also includes an actuator and operates by detecting and measuring sensor displacements caused by shape changes across the width of the moving strip of material. However, the strip of material does not make direct contact with the sensor heads during operation of the non-contact shape sensor device.

In the case of either a contact or non-contact shape sensor device, a linear measurement device is provided on each displacement sensor in order to measure shape changes in a moving strip of material. Each linear measurement device measures sensor displacement resulting from shape changes in a moving strip of material. The measured displacements of the sensors may be used, for example, by an automatic shape control algorithm of a roll leveler or the controller of another automatic shape correction device to determine the shape error in the strip of material.

As should be understood by one of skill in the art, the quantity and spacing of the individual displacement sensors determines the overall resolution of a displacement-type shape sensor device as described above. For example, in one exemplary embodiment of a displacement-type shape sensor device of the invention that is designed for use with a shape-correcting roll leveler apparatus having nine work roll bending devices (flights), the shape sensor device has 18 displacement sensors. Consequently, the number of displacement sensors is twice the number of leveler flights. This is a departure from previous designs, such as the shape sensor devices described in the '301 and '124 patents, where the number of displacement sensors is shown to be one less than twice the number of leveler flights.

Embodiments of the invention also improve on known shape sensor devices, such as the displacement-type shape sensor devices described in the '301 patent and the '124 patent, by including the ability to shift the centerline positions of the collective shape sensors. More particularly, while shape sensor device embodiments of the invention also include a plurality of individual displacement sensors that are arranged to traverse the width of a moving strip of material to be examined, the shape sensors of a shape sensor device according to the invention are collectively shiftable in a direction that is substantially transverse to the direction of travel of the moving strip of material. For example, the sensors may be shifted by a distance that is equal to one half of the center-to-center distance of the sensors.

Shifting the sensor device in the described manner prior to examining a strip of material having a width that would normally result in the edge overhang situation described above, moves the outside edge of one of the outside-most shape sensors closer to one edge of the strip of material. The shift also creates a space that allows an extra shape sensor to be extended (activated) so as to account for the gap along the strip edge that is opposite to the shift direction. With the additional sensor activated, the width distance across the collective sensors is better matched to width of the strip of material, thereby eliminating the aforementioned overhang situation. The active sensors are also properly centered with respect to the strip of material.

Other aspects and features of the invention will become apparent to those skilled in the art upon review of the following detailed description of exemplary embodiments along with the accompanying drawing figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
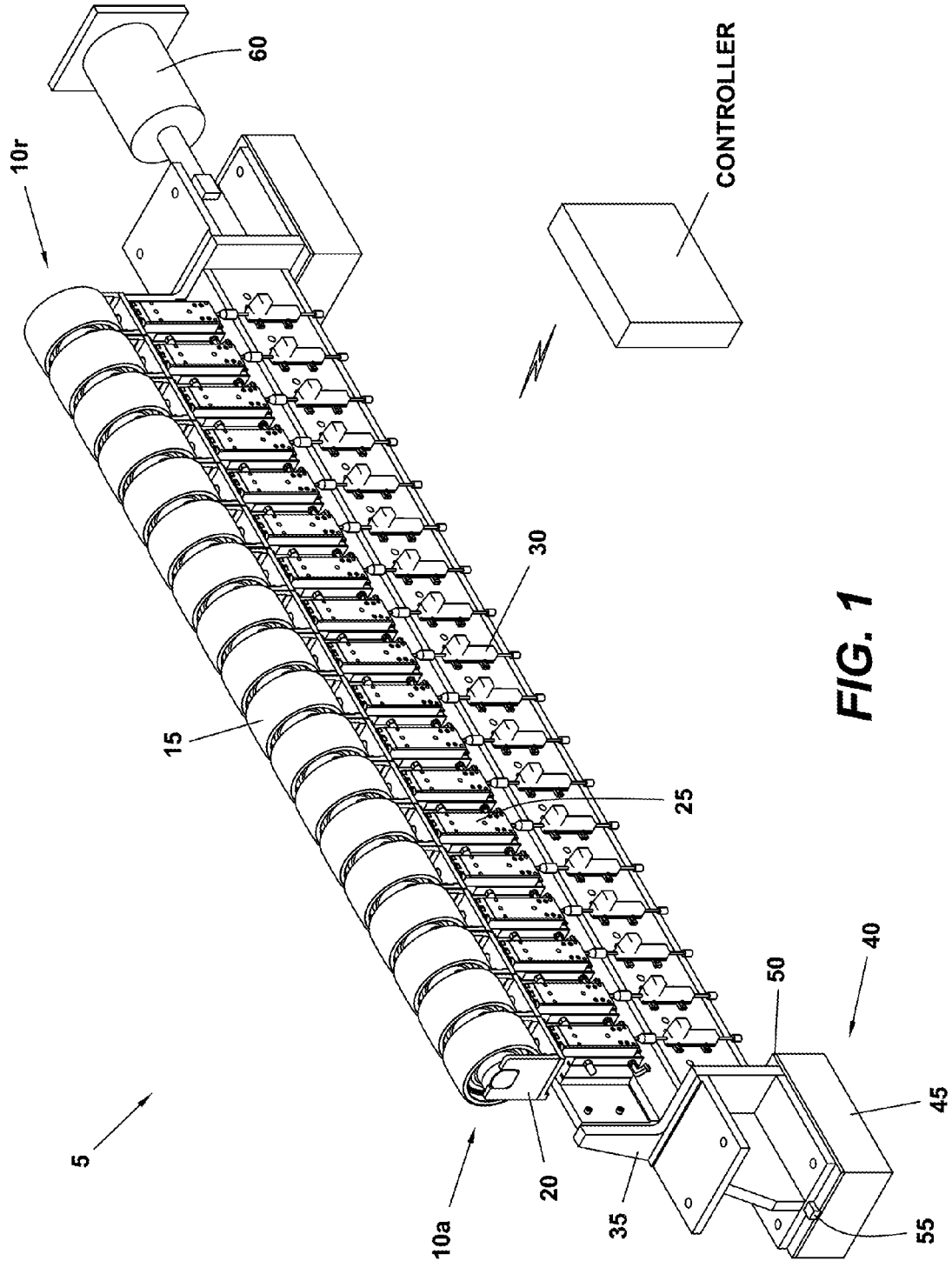
FIG. 1 is a perspective view of one exemplary embodiment of a displacement-type shape sensor device of the invention.

One exemplary embodiment of a shape sensor device 5 according to the invention is shown in FIG. 1. The shape sensor device 5 is a displacement-type shape sensor device that determines the shape error in a moving strip of material by measuring the displacements of a plurality of individual displacement sensors.

As can be seen in FIG. 1, the displacement sensors 10a-10r are aligned in this particular embodiment, and are arranged to traverse various widths of strips of material to be examined. The individual displacement sensors 10a-10r of this embodiment are comprised of sensor heads in the form of free spinning rollers 15, such as free spinning precision roller bearings, that are mounted in an appropriate bracket 20. Each roller-bracket 15, 20 assembly is connected to an actuator 25, such as a pneumatic cylinder, that is provided to impart linear movement thereto in a direction toward and away from a moving strip of material. Each roller-bracket 15, 20 assembly may also be attached to a linear guide (not shown) to further ensure that the roller travels along a desired path.

The shape sensor device 5 detects loose areas across the width of a moving strip of material, which areas generally occur at a portion of the strip that is longer than adjacent portions thereof. For example, when an edge of such a strip of material is longer than its center, the strip may have a wavy edge. Similarly, when the center of such a strip of material is longer than its edges, the strip may have a center buckle.

To this end, the displacement sensors 10a-10r are designed to be gently forced against a moving strip of material as the strip passes by the sensor device 5. The displacement sensors 10a-10r may generally be located below or above a moving strip of material. However, it has been found that employing a subjacent location of the displacement sensors can provide for several advantages, including: a more simplistic threading of the strip of material over the sensors; the negation of backlash in the assembly because gravity is acting on the sensors in the same direction as the deflection forces imparted by the strip; and the elimination of distortion in the strip that may be caused by a bowed exit work roll as the strip leaves a roll leveler. Nonetheless, the displacement sensors 10a-10r may also be located above a strip of material, and such an arrangement is fully within the scope of the invention.

A linear measurement device 30 of preferably high-precision is associated with each displacement sensor 10a-10r. Each linear measurement device 30 measures the displacements caused by passage of its associated roller 20 over areas of dissimilar shape on the moving strip of material. Areas of less tension in the strip of material (i.e., areas such as a wavy edge or center buckle) will be deflected a greater distance by the displacement sensor(s) 10a-10r pressing against those areas. Areas of greater tension (shorter portions) in the strip of material will be deflected a lesser amount by the displacement sensor(s) 10a-10r pressing against those areas. The magnitude of these deflections is measured by the linear measurement devices 30 of the affected displacement sensors 10a-10r and may be used by, for example, an automatic shape control algorithm of a shape correction apparatus to determine and correct the shape error in the moving strip of material. Alternatively, the measured displacements may simply be used to create a shape profile over the length of the strip.

The displacement sensors 10a-10r of the shape sensor device are preferably mounted to a rigid support frame 35 or other suitable mounting structure, so as to ensure that the displacement measurements provided by the linear measurement devices 30 are due only to strip deflection and not any sensor mounting deflections. The fluid pressure supplied to each actuator 25 is preferably the same, to ensure that the roller 20 of each displacement sensor 10a-10r is pressed against the moving strip of material with equal force. Additionally, the fluid pressure supplied to the actuators 25 may be adjustable to allow the displacement-type shape sensor device 5 to produce adequate strip deflection with a variety of strip materials of different elasticity. The fluid pressure supplied to each individual actuator 25 is also preferably interruptible, such that a given shape sensor may be electively retracted from contact with a moving strip of material (i.e., deactivated) during operation of the shape sensor device 5.

Figure 2:
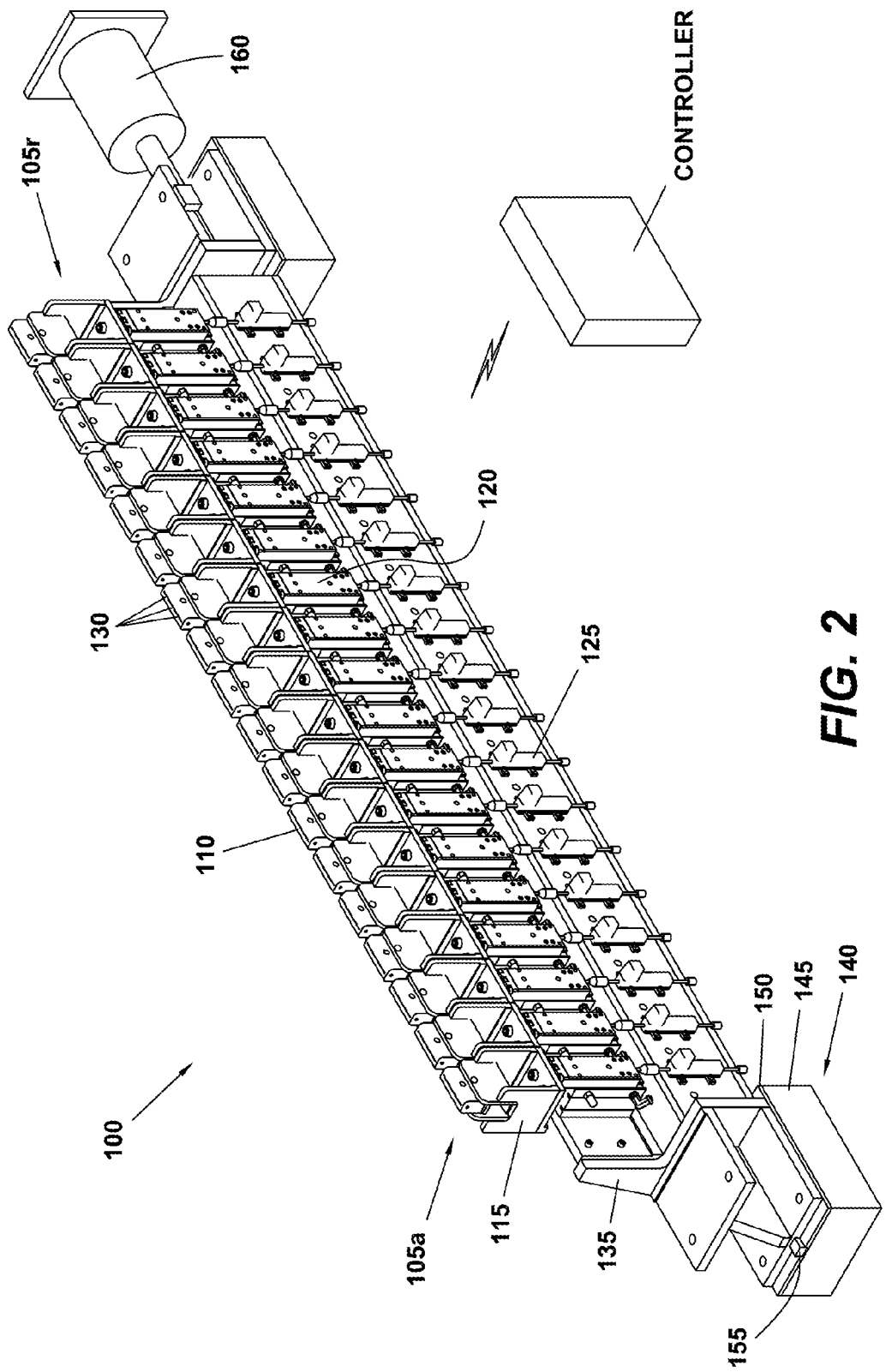
FIG. 2 is a perspective view of another exemplary embodiment of a displacement-type shape sensor device of the invention.

Another exemplary embodiment of a shape sensor device 100 according to the invention is shown in FIG. 2. Like the shape sensor device 5 of FIG. 1, this exemplary shape sensor device 100 is also a displacement-type shape sensor device that determines the shape error in a moving strip of material by measuring the displacements of a plurality of individual displacement sensors 105a-105r. The displacement sensors 105a-105r are again aligned and are arranged to traverse the various widths of strips of material to be examined.

The individual displacement sensors 105a-105r of this exemplary embodiment each include a fluid-emitting sensor head 110 instead of a roller. Each fluid-emitting sensor head 110 is retained in a sensor head mounting bracket 115. The sensor head mounting bracket 115 may allow the fluid-emitting sensor head 110 to pivot in a direction that is substantially perpendicular to the length of the moving strip of material that the non-contact shape sensor device 100 will be used to examine.

The non-contact shape sensor device 100 also detects loose areas across the width of a moving strip of material. Consequently, a sensor head-bracket 110, 115 assembly is connected to an actuator 120, such as a pneumatic cylinder, that is provided to impart linear movement thereto in a direction toward and away from the moving strip of material being examined. Each sensor head-bracket 110, 115 assembly may also be attached to a linear guide (not shown) to further ensure that the sensor head travels along a desired path. A linear displacement measurement device of preferably high-precision 125 is also associated with each sensor assembly 105a-105r.

In a similar manner to the displacement type shape sensor device 5 of FIG. 1, the actuator 120 provides for linear displacement of the fluid-emitting sensor head 110 toward the moving strip of material. However, to provide for non-contact shape measurement, each fluid-emitting sensor head 110 of this shape sensor device embodiment is designed to receive and emit a supply of pressurized fluid during operation. To that end, the top surface of each fluid-emitting sensor head 110 is provided with a plurality of nozzle holes 130 that are located and oriented to direct the pressurized fluid at the passing surface of a moving strip of material. Various fluids may be used in conjunction with such a shape sensor device 100 including, without limitation, air and other gases, water, cleaning liquids such as water/soap mixtures, and liquid coolants.

In operation, the fluid-emitting sensor heads 110 of the individual non-contact shape sensors 105a-105r are moved by their respective actuators 120 to a position in close proximity to the corresponding (i.e., top or bottom) surface of a moving strip of material to be examined. As the strip of material travels past the non-contact shape sensor device 100 under tension, the fluid emitted by the fluid-emitting sensor heads 110 prevents the strip of material from directly contacting the fluid-emitting sensor heads 110. Rather, the strip of material glides over the fluid-emitting sensor heads 110 on a cushion of fluid trapped therebetween.

The linear measurement devices 125 measure sensor displacements that occur in reaction to a shape change in the moving strip of material. That is, the linear displacement devices 125 measure the magnitude of the displacements caused when areas of the moving strip of material having different tensions pass by the sensor heads 110. Areas of less tension in the strip (i.e., areas such as a wavy edge or center buckle) will result in a greater displacement of the sensor(s) 105a-105r corresponding to those areas. Areas of greater tension (shorter portions) in the strip will result in a lesser displacement of the sensor(s) 105a-105r corresponding to those areas. The measured magnitude of the sensor displacements may be used by, for example, an automatic shape control algorithm of a shape correction apparatus to determine and correct the shape error in the moving strip of material. Alternatively, the measured displacements may simply be used to create a shape profile over the length of the strip.

The non-contact displacement sensors 105a-105r of the shape sensor device 100 are preferably mounted to a rigid support frame 135 or other suitable mounting structure, so as to ensure that the displacement measurements provided by the linear measurement devices are due only to changes in strip shape and not any sensor mounting deflections. The fluid pressure supplied to each actuator 120 is preferably the same to ensure that the sensor head 110 of each displacement sensor 105a-105r is biased toward the moving strip of material with equal force. Similarly, the pressure of the fluid emitted by each sensor head is preferably the same to ensure that each sensor head produces a like layer of cushioning fluid. Additionally, the fluid pressure supplied to the actuators 120 may be adjustable. The fluid pressure to each individual actuator 120 is also preferably interruptible, such that a given shape sensor may be electively retracted from a sensing position near a moving strip of material (i.e., deactivated) during operation of the shape sensor device 100.

The shape sensor devices 5, 100 of FIGS. 1-2 are both also adapted for lateral movement, such that the vertical centerline of each shape sensor 10a-10r, 105a-105r of the given shape sensor device may be shifted in a direction that is substantially transverse to the direction of travel of a moving strip of material that passes by the shape sensor device. The purpose of such lateral movement can be best understood by observation of the schematic representations presented in FIG. 5, along with the accompanying description appearing below.

In the exemplary embodiments of the shape sensor devices 5, 100 depicted in FIG. 1 and FIG. 2, lateral movement is made possible by mounting the frame 35, 135 of the shape sensor device on a pair of linear ways 40, 140. The exemplary linear ways 40, 140 are shown to be comprised of a support block 45, 145 topped with a bearing pad 50, 150 that is preferably comprised of a low friction material such as nylon, a phenolic material, etc. The linear ways 40, 140 may include a guiding element that acts to direct lateral movement of the shape sensor 5 device along a desired path. In these particular examples, the guide element is in the form of a key 55, 155 that resides between a corresponding receiving slot in the frame support block 45, 145 and a corresponding slot in the bearing pad 50, 150. Although not shown, a hard stop(s) may also be provided to limit and specifically set the shifted lateral position(s) of the shape sensor device 5, 100.

While lateral shape sensor device movement is facilitated in the exemplary shape sensor device embodiments of FIG. 1 and FIG. 2 by means of the linear ways 40, 140, it is to be understood that embodiments of the invention are in no way limited to such a design. Rather, any element, device or system that will allow a shape sensor device of the invention to be appropriately laterally displaced is considered to be within the scope of the invention, and may be substituted for the linear ways 40, 140 of FIG. 1 or FIG. 2. For example, the linear ways may be replaced with other components that facilitate lateral sliding movement of a shape sensor device such as, without limitation, linear guide blocks and associated guide rails, guide bushings and associated guide rods, ball screw systems, etc. Likewise, nothing herein is to be read as requiring any particular type of connection or point of connection of a shape sensor device to a component(s) for facilitating lateral movement thereof. Alternatively, the frame of other embodiments may not be adapted for such transverse linear displacement. Instead, it is possible to mount the shape sensors of such a shape sensor device embodiment on a transversely displaceable structure that moves on the frame. For example, the shape sensor assemblies may be attached to a common mounting element that is affixed to the frame in a transversely displaceable fashion, such as by means of a guide rail and guide bearing(s). An actuator may then be provided to laterally displace the shape sensor assemblies while the frame remains in a fixed position.

An actuator 60, 160 is respectively provided to produce lateral movement of the exemplary shape sensor devices 5, 100 of FIG. 1 and FIG. 2. As shown, the actuator 60, 160 is a pneumatic cylinder that would be adequately anchored and provided with a supply of pressurized air to produce a linear extension and retraction force sufficient to slide the shape sensor frame 35, 135 back-and-forth along the linear ways 40, 140. In these exemplary embodiments, the actuator 60, 160 may be directly or indirectly coupled to one end of the frame 35, 135 for this purpose. As described in more detail below, the actuator 60, 160 may be controlled by signals from a controller associated with the shape sensor device 5, 100 or another device, such as a shape correction apparatus (e.g., roll leveler).

As with the linear ways 40, 140, an actuator 60, 160 used to impart lateral movement to a shape sensor device of the invention is not limited to a pneumatic cylinder as depicted in FIG. 1 and FIG. 2. Rather, any actuator capable of providing the desired linear movement of the shape sensor device may be employed. Other actuators that may be used include, without limitation, hydraulic cylinders, electric motors coupled to transmission mechanisms or gear reducers, stepper motors, servo motors, and electromagnetic devices.

Figure 3:
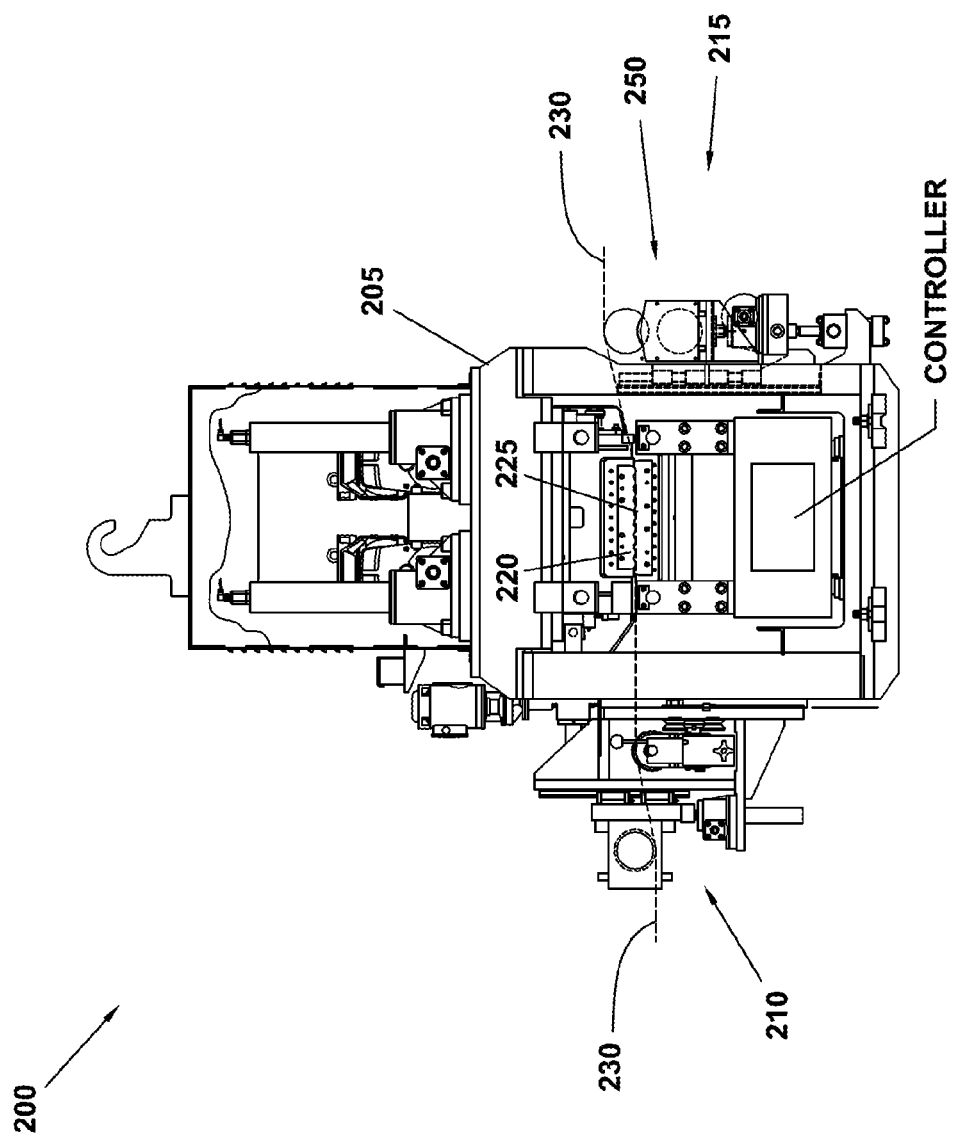
FIG. 3 depicts an exemplary displacement-type shape sensor device of the invention being used in conjunction with a roll leveler.
Figure 4:
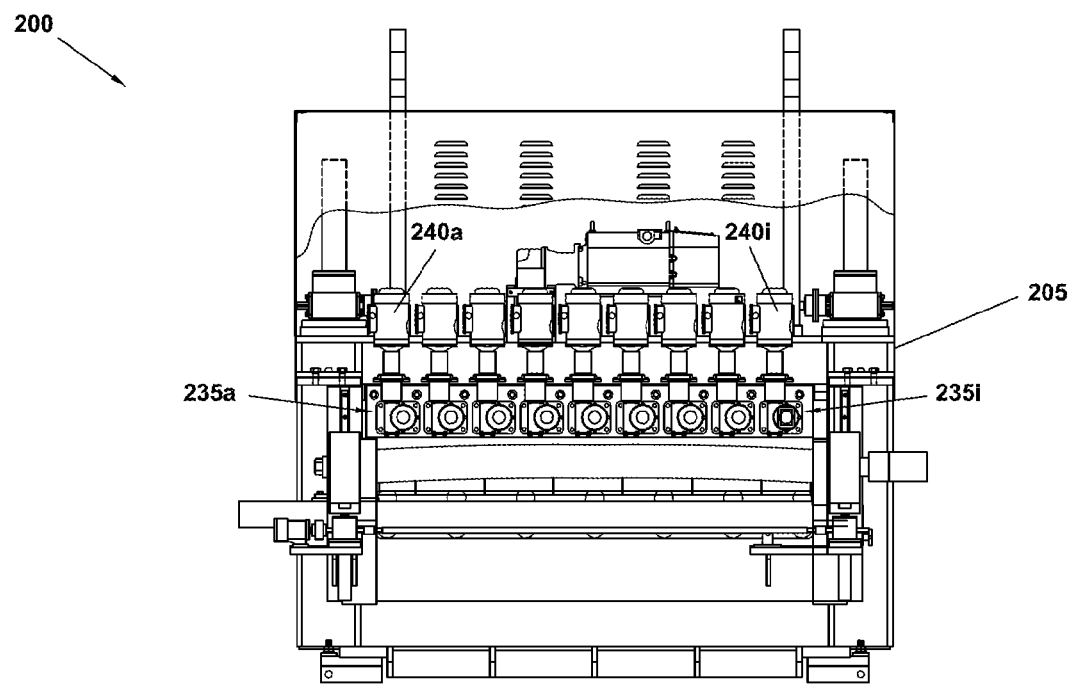
FIG. 4 is a front view of the roll leveler of FIG. 3.

One exemplary embodiment of a roll leveler with automatic shape control 200 that may be used with a shape sensor device of the invention is depicted in FIGS. 3-4 for purposes of illustration. The leveler 200 is generally shown to include a frame 205 and to include an entry side 210 and an exit side 215. A cooperating set of top and bottom work rolls 220, 225 are disposed between a set of platens within the frame 205 of the leveler 200, such that they reside between the entry side 210 and exit side 215 thereof.

As may be observed, a strip of material 230 is being processed by the leveler 200, with the strip 230 passing from the entry side 210 of the leveler 200, through the work rolls 220, 225, and out the exit side 215 of the leveler. As the strip 230 passes through the cooperating sets of work rolls 220,225, the strip of material is flattened (i.e., shape defects are removed from the strip).

Because shape defects and stresses within the strip of material 230 may vary across its width, the work rolls 220, 225 will typically need to apply a non-uniform flattening force thereto. Consequently, the leveler 200 is provided with work roll adjusting devices (not shown for reasons of clarity) designed to provide for a bending of one or more areas of each individual work roll of the work roll sets 220, 225. In this particular embodiment of the leveler 200, the work roll adjusting devices consist of multiple sets of adjusting wedge pairs. Other types of work roll adjusting devices may also be utilized in other leveler embodiments. As would be understood by one of skill in the art, the adjusting wedge pairs reside above backup rollers associated with the upper set work rolls 220. Other embodiments of a leveler may be provided with adjusting wedges or other work roll adjusting devices that allow for bending of only a lower set of work rolls, or for bending of both sets of work rolls.

Bending of the upper work rolls 220 at a particular location can be accomplished by causing movement of the proper adjusting wedge pair of the set of adjusting wedge pairs. Movement of individual wedges in this embodiment of the leveler 200 is accomplished via corresponding wedge adjusting assemblies 235a-235i driven by associated electric motors 240a-240i. This particular leveler embodiment is designed to process strip material up to 72 inches in width. Therefore, there are nine wedge adjusting assemblies 235a-235i that correspond to nine adjusting wedge pairs. The nine adjusting wedge pairs and wedge adjusting assemblies 235a-235i may be also be referred to in the industry as flights. Consequently, it may be said that this particular leveler 200 embodiment has nine flights.

A shape sensor device 250 according to the invention is generically shown in FIG. 3 to reside at the exit side 215 of the leveler 200. The exemplary shape sensor device 250 of FIG. 3 can be seen to include rollers, but it is to be understood that the shape sensor device may also be a noncontact shape sensor device. In any event, the strip of material 230 can be seen to pass over the shape sensor device 250 so that it may be examined for shape defects as described above.

It should be obvious to one of skill in the art that the quantity and spacing of the individual displacement sensors of a shape sensor device of the invention determines the overall resolution of the shape sensor device. Generally speaking, the quantity of displacement sensors of a shape sensor device of the invention will be determined, at least in part, by the width or width range of the strip(s) of material that will be examined using the shape sensor device.

Obviously, a higher resolution may be obtained by simply employing as many shape sensors as possible. However, in reality, the quantity of displacement sensors, as well as the spacing of the displacement sensors will be affected by the physical nature (e.g., size) of the individual shape sensors and any required spacing between the shape sensors as may be dictated by another device(s) with which a given shape sensor device will be used. For example, when a shape sensor device of the invention is used with a roll leveler such as the roll leveler with automatic shape control 200 represented in FIGS. 3-4, the quantity and spacing of the shape sensor device shape sensors is determined primarily by the width of the strip material that will be processed by the leveler, the size and construction of the shape sensors required to impart acceptable durability thereto, the number of leveler flights present, the spacing between the leveler flights, and the logic embedded in the leveler shape control programming.

The exemplary leveler 200 of FIGS. 3-4 is designed to process strips of material up to 72 inches in width which, according to the given design thereof, results in the leveler having nine flights. Additionally, the number of shape sensors provided on a shape sensor device to be used with this leveler must be sufficient at a given spacing to adequately traverse a strip that is up to 72 inches wide. The automatic shape control programming associated with the exemplary leveler 200 has been modified such that a shape sensor of an associated displacement-type shape sensor device may be aligned with each leveler flight, or may be located equidistantly between each leveler flight. As such, the spacing between leveler flights in combination with the shape control programming of the leveler 200 dictates, at least in part, the spacing of the shape sensors of a displacement-type shape sensor device that is used with the leveler. The size (e.g., width) of the individual shape sensors also affects the overall quantity of shape sensors that may be used while also retaining the proper spacing and overall width of coverage.

The exemplary shape sensor devices 5, 100 shown in FIG. 1 and FIG. 2 are reflective of the use thereof with the exemplary leveler 200 of FIGS. 3-4 and the above-described requisite leveler parameters. Consequently, the exemplary shape sensor devices 5, 100 each include 18 displacement-type shape sensors 10a-10r, 105a-105r arranged to detect shape defects in moving strips of material of up to 72 inches wide. In this particular example, this results in a shape sensor to leveler flight ratio of 2:1. Other shape sensor quantities and spacings are, of course, possible in other embodiments of shape sensor devices according to the invention.

Figure 5:
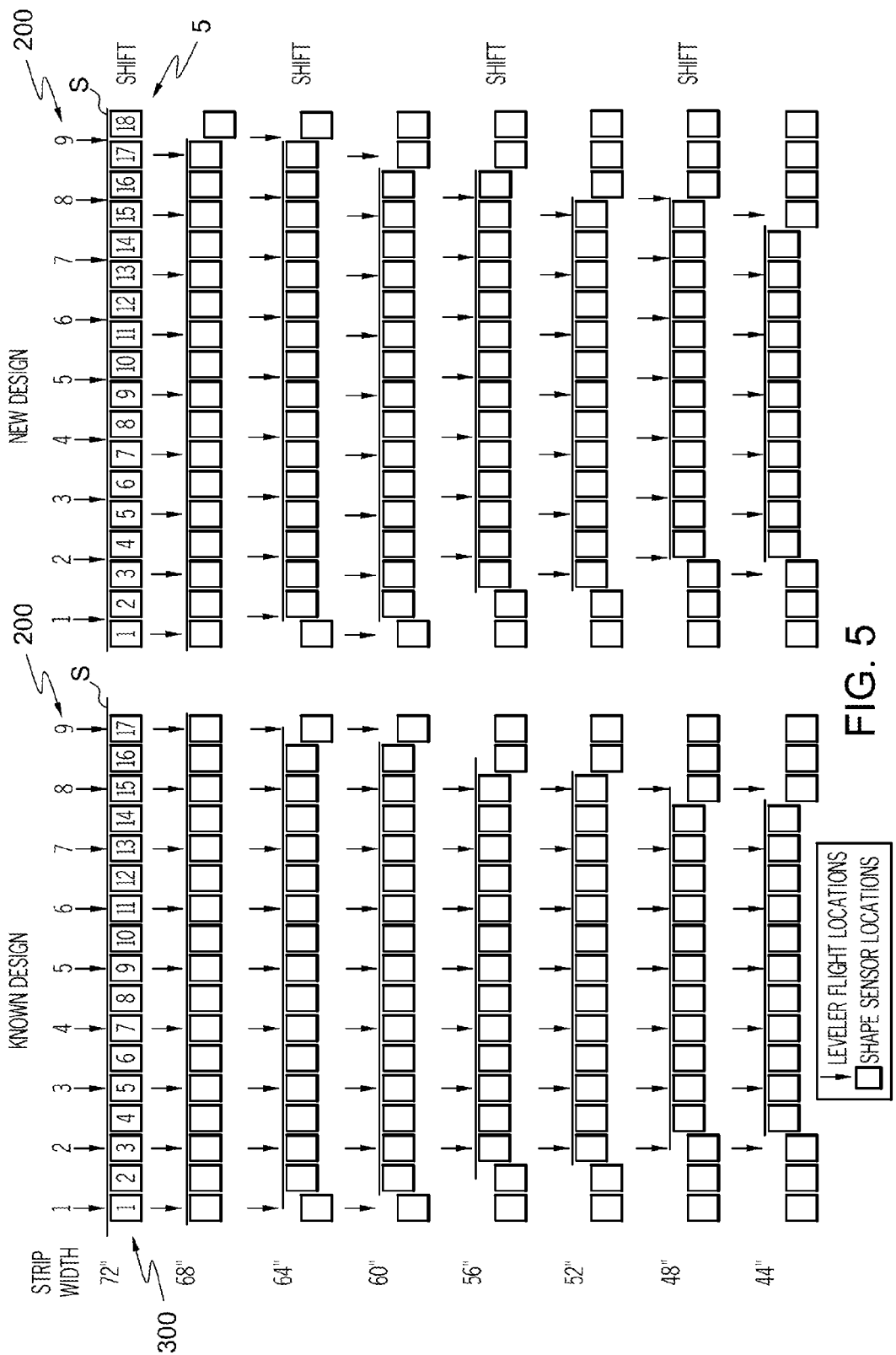
FIG. 5 schematically compares the use of an exemplary shape sensor device of the invention with a known shape sensor device to examine moving strip materials of different widths for shape defects.

Operation of the exemplary shape sensor device 5 of FIG. 1 or shape sensor device 100 of FIG. 2 in association with the exemplary leveler 200 of FIGS. 3-4 may be better understood by reference to FIG. 5. The schematic representations of FIG. 5 further illustrate differences between use of the exemplary shape sensor device embodiments 5, 100 according to the invention with the exemplary leveler 200, and use of a known shape sensor device 300 such as a shape sensor device described in the aforementioned '301 and '124 patents with the use of the leveler 200.

Referring now to FIG. 5, it can be seen that a displacement-type shape sensor device 300 of known design is represented on the left side of the drawing sheet and contrasted with the displacement-type shape sensor device 5 of FIG. 1, which is represented on the right side of the drawing sheet. For purposes of illustration, the shape sensor devices 300, 5 are each shown as they would be used to examine various strips of material between 44 inches and 72 inches in width as said strips of material are being processed by a roll leveler, such as the leveler 200 of FIGS. 3-4.

In the schematic representations of FIG. 5, the strips of material S are shown to pass over the shape sensors of the shape sensor devices 300, 5. The known shape sensor device 300 is shown to have 17 shape sensors, as represented by the corresponding like-numbered rectangles residing below the strip of material S. Similarly, the exemplary shape sensor device 5 of the invention is shown to have 18 shape sensors, as represented by the corresponding like-numbered rectangles residing below the strip of material S. The exemplary leveler 200 and its associated flights are represented by the downwardly-directed arrows numbered from 1-9.

The shape sensor devices 300, 5 are initially shown being used to examine a 72 inch wide moving strip of material as the strip is processed by the leveler 200. In this case, the shape sensors 1-17 of the known shape sensor device 300 are centered under the strip S, with a shape sensor aligned with each leveler flight 1-9. This results in the edges of the strip of material S overhanging the outermost shape sensors 1, 17 by a substantial amount. As discussed above, this is an undesirable condition.

In contrast, when the exemplary shape sensor device 5 of the invention is used to examine a moving strip of material S of the same width, the shape sensors are shifted by approximately one-half of the centerline-to-centerline distance between sensors 10a-10r, and in a direction that is substantially transverse to the direction of travel of the strip of material S. In this particular example, the shape sensors are shifted to the left as shown on the drawing sheet. This moves the outer edge of the left outermost shape sensor 1 to a position that is substantially aligned with or at least nearer the left edge of the strip of material S. Shifting of the shape sensor centerlines also creates a gap at the opposite side of the shape sensor device 5 that allows an additional shape sensor, in this case shape sensor number 18, to be activated and used to examine the strip of material S. Consequently, substantially the entirety of the width of the strip of material S may be examined by the shape sensor device 5, including the edges of the strip that might otherwise be inadequately examined by the known shape sensor device 300.

The ability of the exemplary shape sensor device 5 of the invention to better provide an edge-to-edge examination of strips of material of various widths is further illustrated by the remaining 68 inch through 44 inch strip width examples of FIG. 5. While the strip widths of FIG. 5 occur in 4 inch increments for purposes of illustration, it should be understood that strips of material having widths other than the widths shown may also processed and examined by means of the exemplary leveler 200 and shape sensor devices 300, 5.

As clearly illustrated in FIG. 5, use of the known shape sensor device 300 results in the same edge overhang problem with strip widths of 64 inches, 56 inches, and 48 inches. In contrast, the shifting functionality of the exemplary shape sensor device 5 of the invention, combined with the ability to selectively activate or deactivate individual ones of the shape sensors 1-18, allows the shape sensor device 5 to provide edge-to-edge examination of the strips of material S across all of the depicted widths.

Looking at the use of the shape sensor device 300, for example, with respect to its use to examine the 64 inch wide strip of material, reveals that the two outermost shape sensors 1, 17 are deactivated to avoid travel of the strip edge over a mid-part of the sensor surface. As previously explained, such a situation can cause damage to the strip edges and/or the shape sensors. Unfortunately, this also results in the above-described strip overhang problem. When the exemplary shape sensor device 5 of the invention is used to examine a 64 inch wide strip of material, however, the shape sensors 1-18 may be transversely shifted as described above and the two outermost shape sensors 1, 18 may be deactivated without creating a strip overhang problem. Rather, this action results in the remaining shape sensors 2-17 spanning substantially the entire width of the strip of material S and again providing an edge-to-edge examination thereof.

Various other shape sensor shifting and shape sensor deactivation scenarios are depicted with respect to the remaining strip widths shown in FIG. 5—the result being that, unlike the known shape sensor device 300, the exemplary shape sensor device 5 of the invention is able to consistently provide an edge-to-edge examination of the strips of material S of various width.

The need to transversely shift the shape sensors of a shape sensor device of the invention and the need to deactivate one or more shape sensors thereof may be determined by a controller associated with the shape sensor device or an apparatus (e.g., a leveler with automatic shape control) with which the shape sensor device is used. For example, when provided with sufficient information about the construction of the shape sensor device, and apparatus with which the shape sensor device is being used (if that is the case), a decision to shift the shape sensors and deactivate one or more shape sensors may be based solely on the width of the strip being processed/examined. Such shape sensor device information may include, without limitation, the strip coverage provided by the total span (width) of all the shape sensors, the coverage of a single shape sensor, the gap between shape sensors, the centerline-to-centerline distance between shape sensors, etc. When an associated apparatus is a roll leveler, for example, such information might include the number of leveler flights, the leveler flight locations, the spacing between leveler flights, etc.

It should be noted that transversely shifting the shape sensors of a shape sensor device of the invention, as shown and described herein, results in each flight of an associated leveler being aligned with the gap between corresponding shape sensors of the shape sensor device. In contrast, when the shape sensors of a shape sensor device of the invention are not transversely shifted, each flight of an associated roll leveler is generally aligned with a corresponding shape sensor of the shape sensor device. Consequently, programming associated with a controller of a leveler or other apparatus with automatic shape control capability may be adapted to determine whether the leveler flights are aligned with the shape sensors or aligned with the gaps between shape sensors, and to calculate automatic shape control functions of the leveler accordingly. In one example, strips of material of given widths may cause the automatic shape control program to perform calculations based on a corresponding position of the leveler flights to the shape sensors. Such information may be provided in a lookup table or by other techniques.

While certain exemplary embodiments of the present invention are described in detail above, the scope of the invention is not to be considered limited by such disclosure, and modifications are possible without departing from the spirit of the invention as evidenced by the following claims:

What is claimed is:

1. A displacement-type shape sensor device for detecting shape errors in moving strips of material of different widths, the shape sensor device comprising:
 a plurality of shape sensor assemblies, each shape sensor assembly including a shape sensor head supported within a mount;
 a frame for supporting and locating the shape sensor assemblies either below or above the moving strip of material in a manner such that the shape sensor assemblies are collectively linearly displaceable in a direction that is substantially transverse to a direction of travel of the moving strip of material;
 an actuator adapted to linearly displace the shape sensor assemblies in a direction that is substantially transverse to a direction of travel of the moving strip of material;
 an actuator associated with each shape sensor assembly and adapted to activate the shape sensor assembly by linearly displacing the shape sensor head thereof toward the moving strip of material and to deactivate the shape sensor assembly by linearly displacing the shape sensor head thereof away from the moving strip of material;
 a linear displacement measurement device associated with each shape sensor assembly for detecting an amount of linear movement of the shape sensor head thereof as the moving strip of material passes by the shape sensor device; and
 a controller associated with at least the actuators of the shape sensor device and programmed to, based on the strip width, determine which ones of the shape sensor assemblies are to be activated or deactivated and whether to transversely displace the shape sensor assemblies, and to instruct the respective actuators accordingly.

2. The displacement-type shape sensor device of claim 1, wherein the shape sensor heads of the shape sensor assemblies are rollers.

3. The displacement-type shape sensor device of claim 2, wherein the rollers are free-spinning precision roller bearings.

4. The displacement-type shape sensor device of claim 1, wherein the shape sensor heads of the shape sensor assemblies are fluid-emitting sensor heads that are adapted to direct pressurized fluid at the passing surface of a moving strip of material.

5. The displacement-type shape sensor device of claim 1, wherein the frame is displaceable in a direction that is substantially transverse to a direction of travel of the moving strip of material.

6. The displacement-type shape sensor device of claim 1, wherein the shape sensor assemblies are attached to a common mounting element that is movably connected to the frame in a manner that renders the shape sensor assemblies collectively displaceable in a direction that is substantially transverse to a direction of travel of the moving strip of material.

7. The displacement-type shape sensor device of claim 1, wherein the shape sensor assemblies are transversely displaceable by an amount equal to approximately one half the center-to-center distance between adjacent shape sensor heads.

8. A leveling system for correcting shape errors in moving strips of material of various widths, the system comprising:
    a roll leveler having a plurality of work roll bending devices;
    a shape error detection device associated with the roll leveler, the shape error detection device comprising;
        a plurality of displacement-type shape sensor assemblies disposed in a linear arrangement having a lengthwise direction oriented transversely to a direction of travel of the strips of material, each displacement-type shape sensor assembly further comprising:
        (a) a linearly displaceable shape sensor head supported within a mount;
        (b) an actuator for displacing the shape sensor head toward the moving strip of material; and
        (c) a linear displacement sensor for measuring an amount of linear movement of the shape sensor head as the moving strip of material passes by the shape sensor device;
    a frame for supporting and locating the shape sensor assemblies either below or above the moving strip of material in a manner such that the shape sensor assemblies are collectively linearly displaceable in a direction that is substantially transverse to a direction of travel of the moving strip of material;
    an actuator adapted to collectively displace the shape sensor assemblies in a direction that is substantially transverse to a direction of travel of the moving strip of material; and
    a controller associated with the shape error detection device and programmed to, based on the strip width, determine which ones of the shape sensor assemblies are to be activated or deactivated and whether to transversely displace the shape sensor assemblies, and to instruct the respective actuators accordingly;
    wherein the number of displacement-type shape sensor assemblies of the shape error detection device is equal to twice the number of work roll bending devices present in the roll leveler.

9. The system of claim 8, wherein the shape sensor heads of the shape sensor assemblies are roller bearings.

10. The system of claim 8, wherein the shape sensor heads of the shape sensor assemblies are fluid-emitting sensor heads that are adapted to direct pressurized fluid at the passing surface of a moving strip of material.

11. The system of claim 8, wherein the frame is displaceable in a direction that is substantially transverse to a direction of travel of the moving strip of material.

12. The system of claim 8, wherein the shape sensor assemblies are attached to a common mounting element that is movably connected to the frame in a manner that renders the shape sensor assemblies collectively displaceable in a direction that is substantially transverse to a direction of travel of the moving strip of material.

13. The system of claim 8, wherein the shape sensor assemblies are transversely displaceable by an amount equal to approximately one half the center-to-center distance between adjacent shape sensor heads.

14. The system of claim 8, wherein the controller and associated programming are part of a shape correction apparatus with which the system is being used.

15. The system of claim 8, wherein a controller of the roll leveler is in communication with the shape error detection device and programmed to determine whether the leveler work roll bending devices are aligned with the shape sensor heads or aligned with the gaps between shape sensor heads of the shape error detection device.

16. The system of claim 15, wherein the controller of the roll leveler is further programmed to calculate automatic shape control functions of the leveler according to the determined alignment of the work roll bending devices and the shape sensor heads.

17. A method of detecting shape errors in moving strips of material of various widths, the method comprising:
    providing a shape sensor device, the shape sensor device comprising:
        a plurality of displacement-type shape sensor assemblies disposed in a linear arrangement having a lengthwise direction oriented transversely to a direction of travel of the strips of material, each displacement-type shape sensor assembly further comprising:
        (a) a linearly displaceable shape sensor head supported within a mount;
        (b) an actuator for displacing the shape sensor head along toward the moving strip of material, and
        (c) a linear displacement sensor for measuring an amount of linear movement of the shape sensor head as the moving strip of material passes by the shape sensor device;
    supporting and locating the shape sensor assemblies on a frame below or above the moving strip of material in a manner such that the shape sensor assemblies are collectively linearly displaceable in a direction that is substantially transverse to a direction of travel of the moving strip of material;
    using an actuator to collectively displace the shape sensor assemblies in a direction that is substantially transverse to a direction of travel of the moving strip of material; and
    using a controller that is programmed to, based on the strip width, determine which ones of the shape sensor assemblies are to be activated or deactivated and whether to transversely displace the shape sensor assemblies;

causing the shape sensor assemblies to be collectively linearly displaced in a direction that is substantially transverse to a direction of travel of the moving strip of material when displacement is determined by the controller to be appropriate;

causing individual ones of the shape sensor heads to be activated and advanced toward or deactivated and retracted away from the moving strip of material, as determined by the controller; and determining the flatness of the moving strip of material by using the linear displacement sensor of each of the activated shape sensor assemblies to measure the amount of linear displacement of each respective shape sensor head as it is displaced according to shape changes in the moving strip of material.

18. The method of claim 17, wherein the controller and associated programming are part of a shape correction apparatus with which the shape sensor device is being used.

19. The method of claim 17, wherein the linear displacement measurements observed by the individual linear displacement sensors are provided to an automatic shape control program of a shape correction apparatus with which the shape sensor device is being used.

20. The method of claim 19, wherein the shape correction apparatus is a roll leveler with automatic shape control functionality.

* * * * *

UNITED STATES PATENT AND TRADEMARK OFFICE
CERTIFICATE OF CORRECTION

PATENT NO. : 9,459,086 B2
APPLICATION NO. : 14/182105
DATED : October 4, 2016
INVENTOR(S) : Guil Bergman et al.

It is certified that error appears in the above-identified patent and that said Letters Patent is hereby corrected as shown below:

In the Claims
Column 14, In Claim 17, Line 51:
Please delete the word "along" appearing before "toward".

Signed and Sealed this
Third Day of January, 2017

Michelle K. Lee
*Director of the United States Patent and Trademark Office*